United States Patent [19]

Watson

[11] Patent Number: 4,684,813
[45] Date of Patent: Aug. 4, 1987

[54] HETERODYNE SYSTEM FOR ELECTRIC POWER GENERATION

[76] Inventor: William K. Watson, 5409 Denver Ave. South, Seattle, Wash. 98107

[21] Appl. No.: 688,682

[22] Filed: Jan. 3, 1985

[51] Int. Cl.⁴ .............................................. H02J 1/00
[52] U.S. Cl. .................................... 290/4 A; 307/84; 290/4 C
[58] Field of Search ................. 290/4, 44, 55; 307/84

[56] References Cited

U.S. PATENT DOCUMENTS

| | | | |
|---|---|---|---|
| 372,934 | 11/1887 | Shallenberger | 307/84 |
| 2,878,397 | 3/1959 | Foster | 290/4 A |
| 4,491,739 | 1/1985 | Watson | 290/44 |

Primary Examiner—Bernard Roskoski
Attorney, Agent, or Firm—Seed and Berry

[57] ABSTRACT

Two high frequency AC generators are enabled to deliver a low frequency AC output to a load, by means of heterodyning and rectifying circuitry.

15 Claims, 3 Drawing Figures

HETERODYNE SYSTEM FOR ELECTRIC POWER GENERATION

TECHNICAL FIELD

This invention relates to electric power generation and specifically to means for using two high-frequency alternating current generators to deliver low-frequency alternating current energy to a load.

BACKGROUND ART

A two-pole generator working into a 60-Hz load must operate at exactly 3600 RPM if it is a synchronous generator, and within 10% of 3600 RPM if it is an induction generator of conventional design. Generators with 4, 6 or 8 poles must operate at proportionately lower RPMs to deliver energy directly into a 60-Hz load. A generator can be designed to operate at a much higher RPM in order to reduce its weight, but its output frequency will then necessarily be much higher than the commonly used 60 Hz.

To change a DC or high-frequency AC output to 60 Hz has until now required a costly, complicated inverter circuit. The present invention describes how, by heterodyning the outputs of two high-frequency generators operated at frequencies which differ from each other by 60 Hz, only a simple rectifier circuit is needed to deliver power to the load at 60 Hz.

SUMMARY OF THE INVENTION

In general terms, two high-frequency electrical generators produce output frequencies which differ from each other by the desired load frequency, generally 60 Hz. The two generator outputs at these two different frequencies are then added together (hetrodyned) so that the voltages involved alternately reinforce and oppose each other to form a beat frequency voltage output whose envelope varies at the desired load frequency. A simple and conventional rectifier circuit is all that is then required to convert the electrical energy in this beat frequency output to an electrical output at the envelope frequency—the frequency required by the load. The system has direct application wherever a high generator power/weight ratio is essential, and a low frequency AC output is desired.

Several novel arrangements are disclosed which show (a) how to achieve a constant frequency difference in two generator output frequencies, (b) how the two frequencies thus produced can be combined (heterodyned) to form a beat frequency output which can be rectified to produce the low-frequency required by the load, and (c) how phase adjustment can be provided for.

If a constant RPM shaft input can be arranged and the generators are to deliver power to an isolated load, a relatively simple arrangement is possible in which a main gear mounted on the shaft drives the generators through two side gears, with one side gear possessing one more tooth than than the other side gear, so that one generator is driven at a slightly lower RPM than the other generator. By taking into account the number of poles in each generator, the needed difference in generator output frequencies can be attained by a proper choice of the shaft input RPM and the number of teeth assigned to the main and side gears.

When the input shaft RPM from the power source is variable and the output from the two generators must be matched in voltage, frequency, and phase to an existing network of generators and loads, a differential gear system will enable a synchronous motor, which is powered by the network at the network frequency, to rotate one generator faster than the other at a fixed difference in RPM. This fixed difference in RPM will be largely unaffected by wide variations in input shaft RPM from the driving source. Given this fixed difference in generator RPM, a proper choice of gear ratios in the associated gear system, which takes into account the number of poles per generator, will produce the desired fixed frequency difference in electrical outputs of the two generators.

The two generator outputs are then added together to produce a beat frequency output which, when rectified, enables energy to be delivered to the network load at the network frequency which is powering the synchronous motor.

The voltages of two high-frequency generators can be added together to form a beat frequency output either directly, by making the output voltage of one generator the input voltage for the other, or indirectly, by using windings in a transformer to add the voltage outputs of the two generators together.

The phase of the rectified output frequency can be adjusted to network requirements by mounting the frame of one generator so that it can be rotated through a limited arc, thereby temporarily raising or lowering the frequency of this generator's output. By this means, phase angle of the electrical output of one generator can be shifted relative to the other until the phase angle of the rectified beat frequency output correctly matches the network phase angle.

BEST MODE FOR CARRYING OUT THE INVENTION

For clarity of presentation, the major features of this invention will first be presented in outline form, along with the numbers of the drawings which most clearly illustrate each feature. Then, a detailed description will follow which deals with each major feature as a separate part.

1. Isolated Load Version: The relatively simple version of this invention shown in FIG. 1 can be used when generator power is to be delivered to an isolated load and when power input shaft RPM can be kept within an acceptably narrow range of variation by a speed governor or other means.

2. Network Load Version: A more elaborate version of this invention shown in FIG. 2 allows input shaft RPM from the power source to vary widely, even though the generator electrical output must be delivered to a network load at a frequency matching the network frequency.

Figure 2:
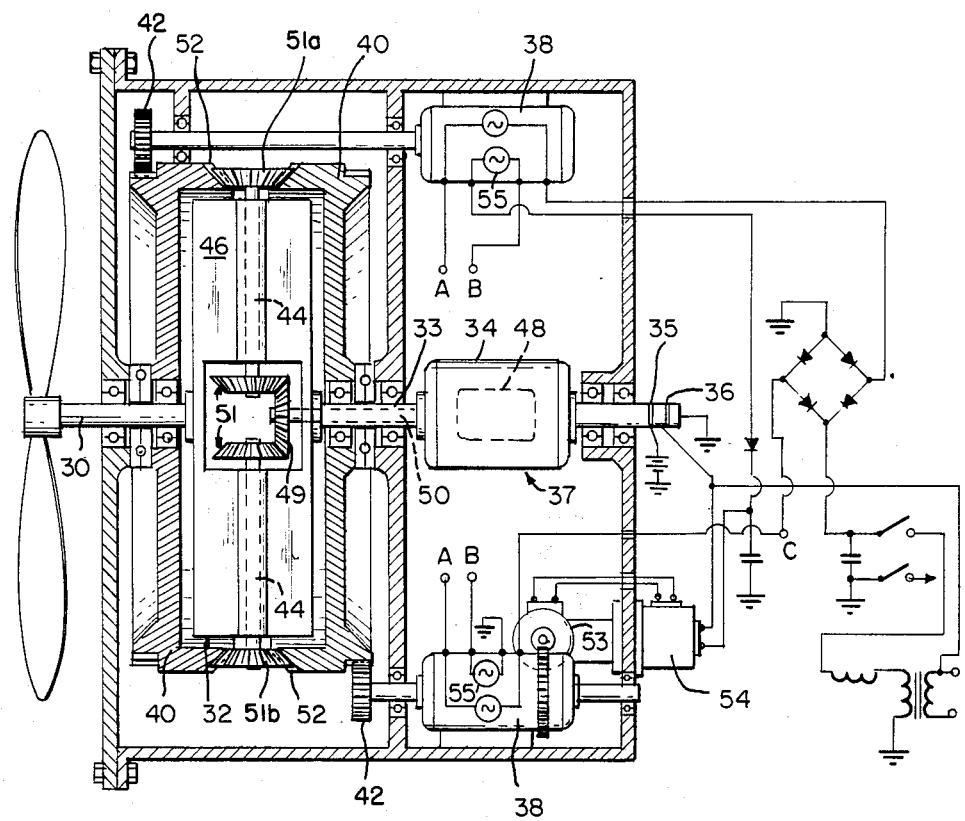
FIG. 2 is a partially schematic and plan view partially cut away showing how a differential gear system will enable a synchronous motor to maintain a constant difference in the RPMs at which two high-frequency generators are driven.

3. Phase Adjustment: FIG. 2 also illustrates how the frame of one generator can be mechanically rotated as a means of shifting phase in the rectified beat frequency output of the two generators in order to match phase with that of the utility system into which power is to be fed.

Figure 1:
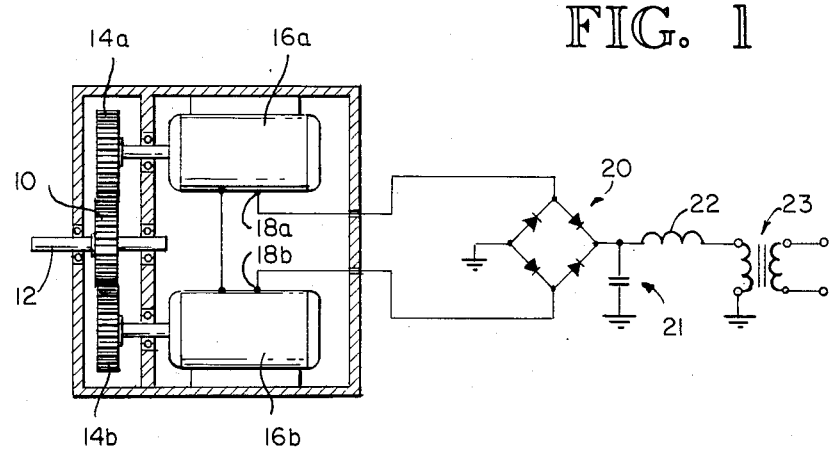
FIG. 1 is a partially schematic and plan view partially cut away showing how two high-frequency generators can be driven by a common power input shaft, and how their electrical outputs can be combined and rectified to delivery energy at the frequency required by the load.
Figure 3:
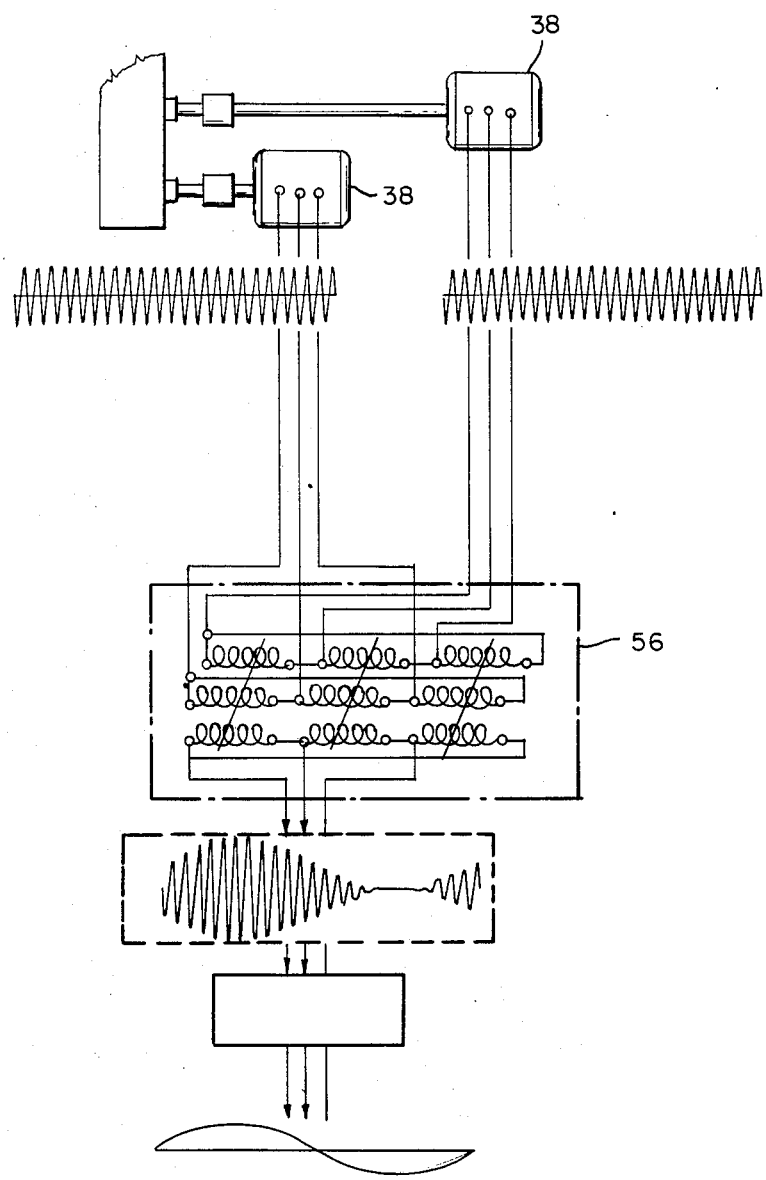
FIG. 3 is a schematic showing how the outputs of two generators operating at two different frequencies can be combined in a transformer to produce a beat frequency output which can then be rectified and delivered to the load.

4. Heterodyne Transformer: In FIGS. 1 and 2, the beat frequency output is produced by placing the two high-frequency generators in series with each other. FIG. 3 shows how a transformer can also be used to mix (heterodyne) the outputs of the two generators to create the beat frequency output which can be rectified to deliver low-frequency electrical energy to the load.

Part 1: Isolated Load Version

In FIG. 1, a center gear 10 mounted on constant-speed input shaft 12 drives two side gears 14a and 14b, which in turn drive high-frequency generators 16a and 16b. One side gear is given at least one more tooth than the other side gear, which causes one generator to rotate slightly slower than the other generator.

Given the number of poles per generator, a proper choice of the number of teeth assigned the center gear 10 and side gears 14 and 14b (accompanied, if necessary, by some adjustment of shaft input RPM) will produce a frequency difference between generator output frequencies which will be the frequency at which electrical energy is to be delivered to the laod. For example, if one side gear 14a is given 29 teeth, is rotated at 450 rev/sec, and drives an eight-pole generator, the generator 16a will produce its output at $450 \times 8/2 = 1800$ Hz. If the remaining side gear 14b is given one more tooth (30 teeth) it will be rotated by the same power input shaft at $29/30 \times 450 = 435$ rev/sec. The eight-pole generator 16b driven by the 30-tooth side gear will produce its output at $435 \times 8/2 = 1740$ Hz. The difference between 1800 Hz and 1740 Hz is 60 Hz, the frequency generally needed by the load.

The means used in FIG. 1 to mix (heterodyne) the voltage outputs of the two generators 16a, 16b is to make the voltage output of one generator the voltage input for the remaining generator. Because of the difference in generator output frequencies, the voltages that the two generators produce will alternately reinforce and oppose each other, producing a beat frequency combination of voltages, measured from the input terminal 18a of the first generator to the output terminal 18b of the second generator. An "envelope" connecting the peaks if the beat frequency voltage fluctuations thus produced will vary in amplitude at a frequency equal to the difference in frequency of the electrical outputs of the two generators. Rectifier circuit 20 then converts this beat frequency into an offset or DC biased voltage output at the much lower envelope frequency, which is the frequency at which power is to be delivered to the load. A capacitor 21 smooths the shape of the rectified waveform to more closely follow the beat frequency of the envelope. An inductor 22 filters out any high frequency ripples which have not been sufficiently smoothed by the capacitor. Transformer 23 shifts the biased output from the rectifier circuit to an output with the normal negative and positive swings relative to ground.

Part 2: Network Load Version

In the version of the invention shown in FIG. 2, a power input shaft 30, bevel gear assembly 32, torque tube 33, and synchronous motor frame 34 are connected together to rotate as a unit about a common axis. Stator slip ring 35 and rotor slip ring 36 provide electrical contacts for the stator and rotor windings, respectively, for the synchronous motor 37. The stator can be energized through the stator slip ring by any suitable direct current source, such as a battery.

The bevel gear assembly 32 is used to rotate a pair of high-frequency generators 38 via ring gears 40 and spur gears 42. The two rings gears 40 contain the same number of teeth, as do the two spur gears 42, so that if radial bevel gear shafts 44 on bevel gear carrier 46 were to be locked against rotation about their own axis, rotation of the bevel gear carrier 46 with the power input shaft would cause the two ring gears to rotate at the input shaft RPM, and the two generators would also be driven at equal RPM via the spur gears.

When alternating current is fed to the rotor windings of the synchronous motor 37, the rotor 48 will begin to rotate with respect to the motor frame 34 and stator windings, which are already rotating with the bevel gear carrier 46, torque tube 33 and the power input shaft 30. The additional angular velocity of the rotor will be transferred to central bevel gear 49 by rotor shaft 50. The rotor shaft rotates within the torque tube. The rotation of the central bevel gear 49 will cause the bevel gears 51a and 51b and radial bevel gear shafts 44 to begin rotating about their own axis in addition to their original rotation about the power input shaft axis. The ring gears 40 are caused to rotate about the power input shaft axis by ring gear teeth 52. Under these circumstances, one ring gear will rotate about the power input shaft axis at a somewhat faster RPM than the remaining gear, and one generator will rotate faster than the other generator by an amount which is determined entirely by the rotation of the rotor of the synchronous motor. Thus the spur gears 42 will rotate the generators at different speeds. The difference in speed is entirely independent of how fast the power input shaft is revolving.

After determining the number of poles in the synchronous motor 37 and the number of poles in the generators 38, the number of teeth assigned rings gears 40 and spur gears 42 can be chosen so that the difference in frequency outputs of the two generators is equal to the frequency of the electrical input to the synchronous motor or to some other desired frequency. As described in Part 1, the outputs of the two generators are added together to produce a beat frequency combination of voltages which can be recified to produce an output at the envelope frequency (i.e., the frequency at which power is to be delivered to the load).

Part 3: Phase Adjustment

As a condition for delivery of electrical energy from the two generators 38 to a utility system, both the frequency and phase of this energy must match that of the utility system. The means disclosed in FIG. 2 for matching the phase is to mount one generator so that its frame can be rotated through a limited arc by a gear motor 53. A phase-comparing circuit in an amplifier 54 compares the phase of the rectified beat frequency of the outputs of two auxiliary windings 55 incorporated into the two high frequency generators with the phase of the utility system. If there is a difference in phase, the gear motor 53 rotates the frame of one generator to compensate accordingly.

This rotation has the effect of shifting the points in time at which the voltage outputs of the two generators reinforce and oppose each other and will have the effect of shifting phase in the final, rectified output from the two generators. When the phase produced by combining and rectifying the outputs from auxiliary windings 55 matches phase with the utility system, the amplifier 54 will cease causing the gear motor 53 to rotate the generator frame, and power can then be fed into the utility system at precisely the right phase.

Part 4: Heterodyne Transformer

In FIGS. 1 and 2 the method used for producing a beat frequency combination of the outputs of two high-frequency generators is to wire their rotor windings in series. In an alternative method shown in FIG. 3, the outputs of the two high-frequency three-phase generators are fed into the primary side of a transformer 56. The output from the secondary side of this transformer will then contain the beat frequency combination of these outputs, which can then be rectified for delivery to the load, as described in Part 1.

While preferred embodiments of this invention have been shown and described, those skilled in the art will recognize variations and modifications which might be made without departing from the inventive concept. For example, beat frequencies other than 60 Hz can radily be obtained, if desired, by changing the ratio of teeth on the two side gears. A transformer may be used to remove DC bias from the rectified signal. Therefore, the invention and claims should be construed liberally in view of this description and should only be limited as necessary in view of the pertinent prior art.

I claim:

1. In generators which generate electrical energy by relative motion of an electromagnetic field with respect to armature windings, means for using two higher frequency generators to generate a lower frequency output, comprising:
   (a) means for causing at least two generators to produce electrical outputs at two separate frequencies, wherein the difference in said frequencies is equal to the frequency at which it is desired to deliver electrical energy to an electrical load;
   (b) means for adding the electrical outputs of said generators together so that the voltages involved alternatively reinforce and oppose each other, whereby a beat frequency combination of said voltages is produced whose envelope will vary at a frequency equal to the difference in generator frequencies; and
   (c) means for rectifying said beat frequency to produce an electrical output at said envelope frequency for delivery to an electrical load.

2. The system of claim 1 wherein the means for causing a difference in frequencies in the electrical outputs of said generators includes a power input shaft which causes a central gear mounted on the shaft to rotate two side gears, each of which side gears is connected to a respective generator, and wherein the number of teeth on each side gear differs, so that one side gear is rotated by the center gear at a faster RPM than the other side gear, and so that one generator is correspondingly rotated faster than the other generator, causing it to produce its electrical output at a higher frequency than the other generator, assuming both have the same number of poles.

3. The system of claim 1 wherein the means for causing a difference in frequencies of the electrical outputs of said generators includes a differential gear system driven by a synchronous motor, wherein the rotation of a rotor of said motor with respect to its frame causes the differential gear system to rotate one of said generators faster than the remaining generator, so that, with an equal number of poles, the output of one of said generators will be produced at a higher frequency than the output of the remaining generator.

4. The system of claim 3, further comprising means for using said synchronous motor to match the final frequency output of said generators to a predetermined frequency, including:
   (a) an independent source of electrical energy for said synchronous motor, whose frequency is the predetermined frequency at which it is desired to delivery energy to the load; and
   (b) gear teeth ratios in said differential gear system which cause the difference in frequencies produced by said generators to equal the frequency of the independent source of electrical energy used to drive said synchronous motor.

5. The system of claim 1, further comprising an arrangement of windings of said generators so that the output of one generator can be made the input voltage for the remaining generator and so that an output voltage can be produced across both generators which combines the instantaneous voltage outputs of each generator, whereby, with a frequency difference in the voltage outputs of the two generators, said voltage outputs will alternately reinforce and oppose each other, and their addition will produce a predetermined beat frequency.

6. The system of claim 1, further comprising a separate transformer to combine the voltage outputs of said generators at two different frequencies to produce a beat frequency.

7. The system of claim 1, further comprising an output transformer to remove the DC bias from the electrical outputs of said rectifying means when said rectifier output is either entirely negative or positive with respect to ground, whereby an electrical output is produced with the normal voltage swings positive and negative with respect to ground, as required for delivery to the load.

8. The system of claim 1, further comprising a phase-matching system including:
   (a) Two generators each having a stator, a stator frame, windings, and a rotor;
   (b) two auxiliary windings on said generators to produce voltage outputs independent of the effect of the load to which energy is to be delivered;
   (c) an amplifier incorporating a phase-comparing circuit which compares the phase angle in combined and rectified output from said auxiliary windings with the phase angle in the existing electrical system; and
   (d) means for rotating the stator frame and windings in one generator to remove the difference in phase angle.

9. An electrical AC generation system for developing a predetermined frequency output from higher frequency inputs, comprising:
   (a) a rotational power input;
   (b) a pair of electrical generators;

(c) means connected to the input for turning the generators simultaneously at rotational velocities which produce electrical outputs at two different frequencies, which differ by a predetermined frequency;

(d) means for combining the electrical outputs from the generators to produce a beat frequency output at the predetermined frequency; and (e) a rectifier for rectifying the beat frequency output to produce the desired AC electrical output at the predetermined frequency.

10. The system of claim 9, further comprising means for shifting the phase angle of the AC output to allow matching the phase to an existing electrical system.

11. The system of claim 9, further comprising a transformer to remove DC bias from the rectified output of the generators.

12. The system of claim 10, further comprising a transformer to remove DC bias from th rectified output of the generators.

13. A method for generating a low frequency AC electrical output at a constant predetermined frequency, from two high frequency AC electrical inputs, comprising the steps of:

(a) rotation of two electrical generators simultaneously by a source of power, at rotational velocities which cause their electrical outputs to differ in frequency by a predetermined frequency difference, (b) combination of the two AC electrical outputs of the two generators to produce a beat frequency combination of their electrical outputs, whose envelope will vary at the predetermined frequency, (c) rectification of the beat frequency combination of the outputs of said generators to produce an AC electrical output at the envelope frequency, which will be the constant, predetermined frequency at which an electrical AC output is desired.

14. The method of claim 13, further comprising the steps of:

(a) comparison of the phase angle of the rectified AC electrical output from said generators with the phase angle existing in the electrical system to which it is desired to deliver the power output of said generators, (b) adjustment of the phase angle of the rectified AC output from the generators to match the phase of the existing electrical system.

15. The method of claim 14, wherein the step of adjusting the phase angle of the rectified AC output of the generators to match that of the electrical system includes rotation of the frame mounted windings of one generator through an arc concentric with the axis of rotation of the generator rotor, as a means of producing the desired shift in phase angle.

* * * * *